United States Patent
Shishikura et al.

(10) Patent No.: US 10,707,509 B2
(45) Date of Patent: Jul. 7, 2020

(54) REDOX FLOW BATTERY

(71) Applicant: SHOWA DENKO K.K., Tokyo (JP)

(72) Inventors: Toshikazu Shishikura, Tokyo (JP); Hiroshi Kobayashi, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 695 days.

(21) Appl. No.: 15/286,650

(22) Filed: Oct. 6, 2016

(65) Prior Publication Data

US 2017/0025698 A1 Jan. 26, 2017

Related U.S. Application Data

(63) Continuation-in-part of application No. PCT/JP2015/057106, filed on Mar. 11, 2015.

(30) Foreign Application Priority Data

Apr. 11, 2014 (JP) ................................. 2014-081990

(51) Int. Cl.
*H01M 8/08* (2016.01)
*H01M 4/92* (2006.01)
(Continued)

(52) U.S. Cl.
CPC ........... *H01M 8/08* (2013.01); *H01M 4/9041* (2013.01); *H01M 4/921* (2013.01);
(Continued)

(58) Field of Classification Search
CPC .... H01M 4/9041; H01M 8/0254; H01M 8/08; H01M 4/921; H01M 8/20; H01M 8/188; Y02E 60/528
(Continued)

(56) References Cited

U.S. PATENT DOCUMENTS

| 4,786,567 A | 11/1988 | Skyllas-Kazacos et al. |
| 5,618,641 A * | 4/1997 | Arias ...................... H01M 2/08 29/623.2 |

(Continued)

FOREIGN PATENT DOCUMENTS

| CN | 203659987 | * | 6/2014 | ............. H01M 4/86 |
| JP | 60-160567 A | | 8/1985 | |

(Continued)

OTHER PUBLICATIONS

"Corrugated bipolar plate for zinc-bromine battery" by Liu Xue Jun et al. in (CN203659987 (U) Jun. 18, 2014) English language machine translation. (Year: 2014).*

(Continued)

*Primary Examiner* — Jonathan G Jelsma
*Assistant Examiner* — Omar M Kekia
(74) *Attorney, Agent, or Firm* — Sughrue Mion, PLLC

(57) ABSTRACT

Provided in the present invention is a redox flow battery including a positive electrode, a negative electrode and a separation membrane, wherein a positive electrode electrolyte composed of an aqueous solution containing vanadium ions is supplied into a positive electrode chamber, and a negative electrode electrolyte composed of an aqueous solution containing vanadium ions is supplied into a negative electrode chamber, to carry out charging and discharging of the battery. In the redox flow battery, zirconium or titanium coated with a noble metal or a compound thereof is used as a positive electrode material, and when the positive electrode material is zirconium coated with a noble metal or a compound thereof, the positive electrode electrolyte and the negative electrode electrolyte contain sulfuric acid; and when the positive electrode material is titanium coated with a noble metal or a compound thereof, the positive electrode electrolyte contains nitric acid.

16 Claims, 5 Drawing Sheets

(51) Int. Cl.
*H01M 4/90* (2006.01)
*H01M 8/0254* (2016.01)
*H01M 8/18* (2006.01)
*H01M 8/20* (2006.01)

(52) U.S. Cl.
CPC ......... *H01M 8/0254* (2013.01); *H01M 8/188* (2013.01); *H01M 8/20* (2013.01); *Y02E 60/528* (2013.01)

(58) Field of Classification Search
USPC .......................................................... 429/81
See application file for complete search history.

(56) References Cited

U.S. PATENT DOCUMENTS 6,509,119 B1  1/2003  Kobayashi et al.
2003/0211374 A1*  11/2003  Dehne ................. H01M 8/0267
                                                                                429/414
2004/0191623 A1  9/2004  Kubata et al.
2013/0230793 A1  9/2013  Wang
2014/0030573 A1*  1/2014  Esswein ............ H01M 10/4242
                                                                                429/107

FOREIGN PATENT DOCUMENTS

JP   62-186473 A    8/1987
JP   2000-357520 A  12/2000
JP   2002-367657 A  12/2002
JP   2013-4351 A    1/2013

OTHER PUBLICATIONS

International Search Report PCT/JP2015/057106 dated Apr. 28, 2015.

* cited by examiner

[Fig. 1]
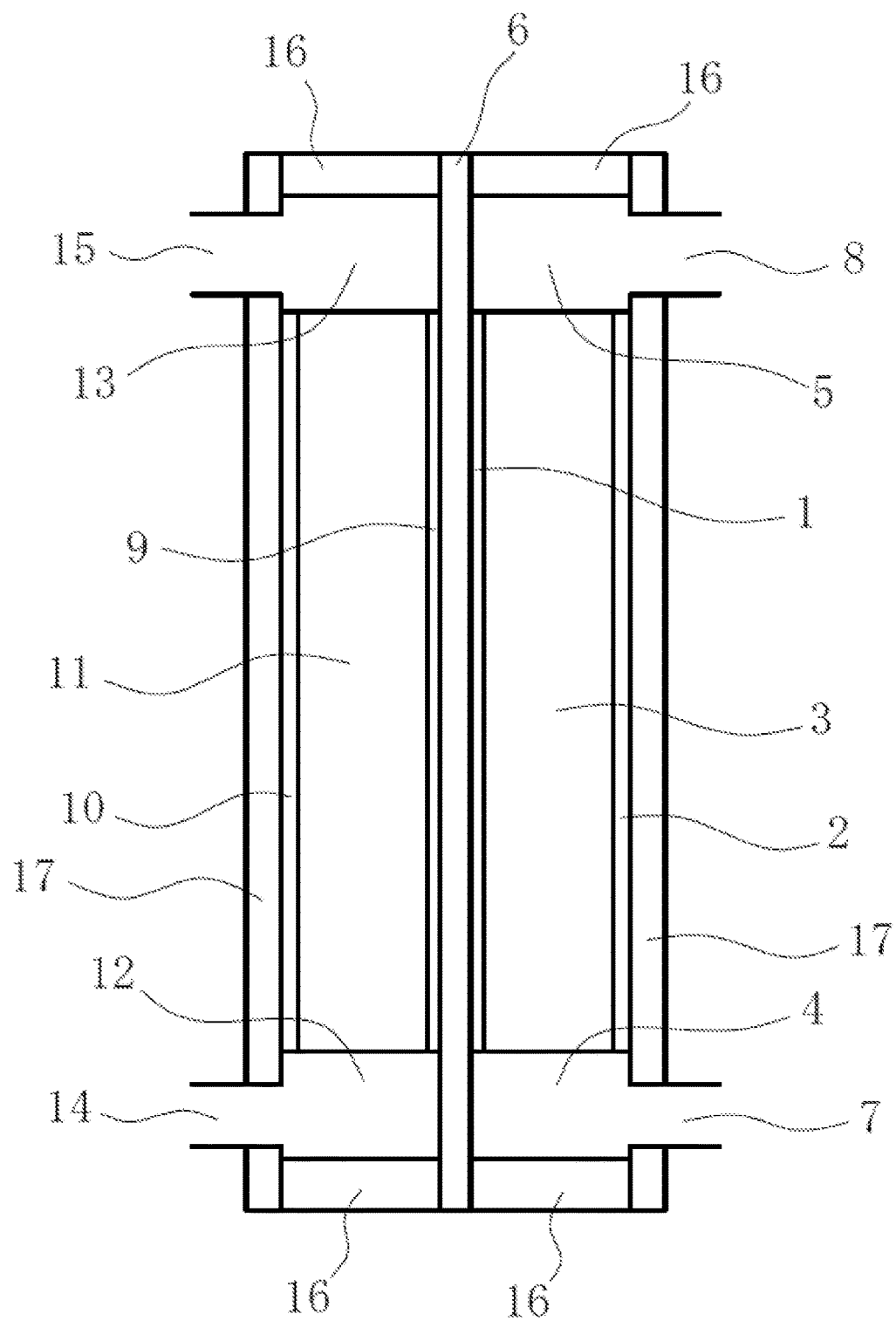

[Fig. 2]
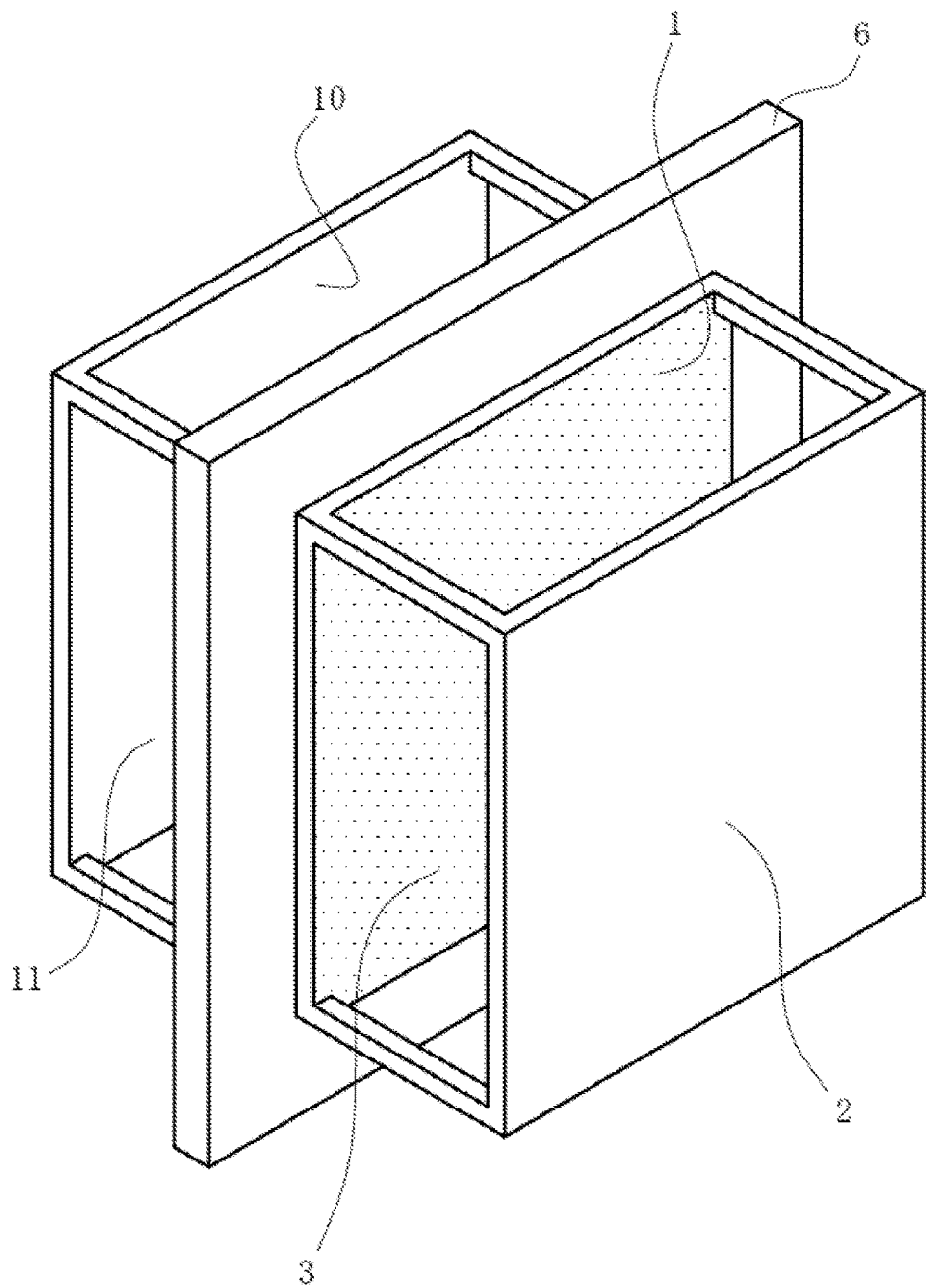

[Fig. 3]
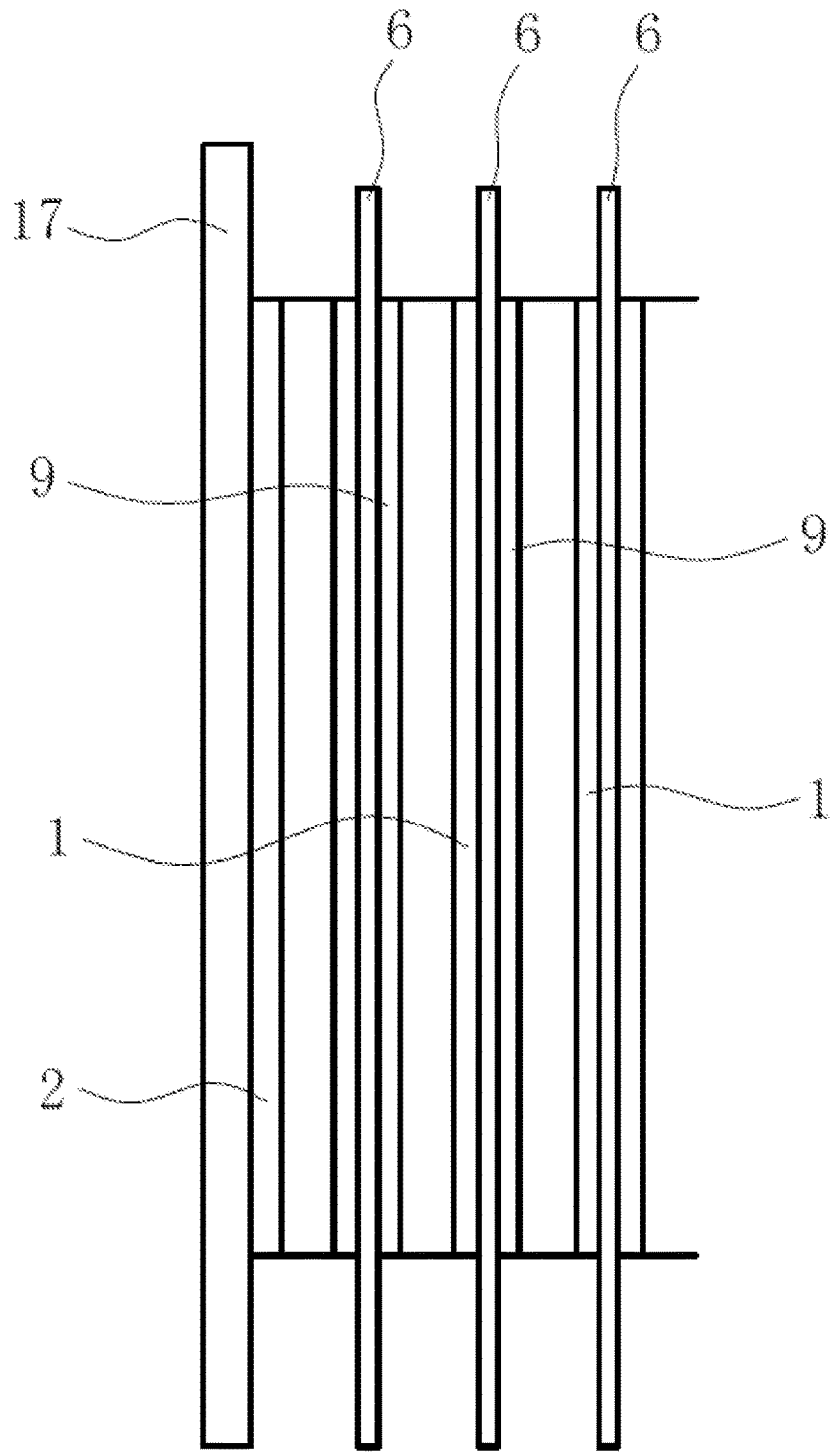

[Fig. 4]
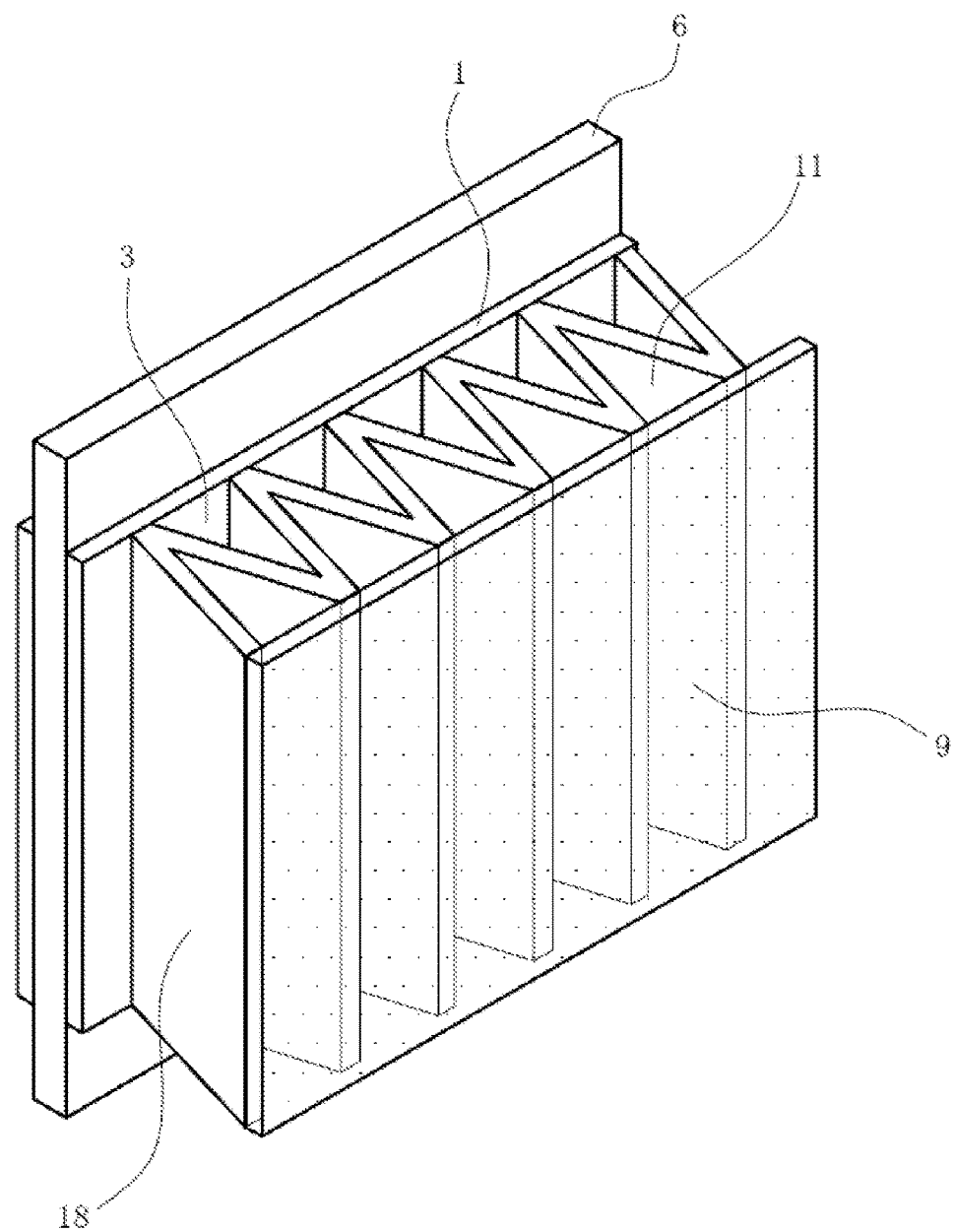

[Fig. 5]
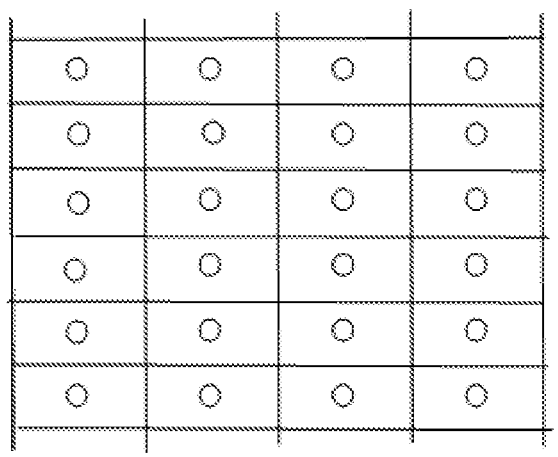

REDOX FLOW BATTERY

TECHNICAL FIELD

The present invention relates to a redox flow battery.

BACKGROUND ART

Redox flow batteries are used for measures for electric load-leveling and momentary stop, and are attracting attention as novel batteries for electricity storage. For example, a redox battery in which vanadium is used as an active material is known (see Patent Document 1, for example). Patent Document 1 discloses a redox flow battery in which a dimensionally stable electrode including a titanium sheet or a titanium mesh plated with a noble metal, a graphite rod, a graphite plate, or a carbon fiber material is used as a positive electrode material. Regarding the redox flow battery disclosed in Patent Document 1, conduction failure due to anode passivation of the titanium sheet, and insufficient durability due to oxidation of the graphite or carbon material are described. Further, Patent Document 1 describes the corrosion resistance of an electrode composed of titanium whose surface is covered with iridium oxide, but is silent about the cycle performance of the battery including the electrode.

In recent years, a carbon felt material is often used as the electrode material for the positive electrode and negative electrode in a redox flow battery, and in many cases, the battery is operated with limitations on the charging voltage in order to improve the durability (see Patent Document 2, for example).

In general, a vanadium redox flow battery includes a separation membrane composed of an ion exchange membrane, and a felt positive electrode and a felt negative electrode made of a carbon material and disposed on both sides of the separation membrane. A positive electrode chamber and a negative electrode chamber are disposed so as to incorporate the respective electrodes and electrolytes therein, thereby forming a single cell battery. In the case of a cell stack battery in which a plurality of single cells are combined, bipolar plates each configured to collect power from adjacent positive electrode and negative electrode are disposed between the respective cells. Further, the above described redox flow battery is provided with a positive electrode electrolyte tank for storing a positive electrode electrolyte and a negative electrode electrolyte tank for storing a negative electrode electrolyte, and the positive electrode electrolyte is supplied into the positive electrode chamber by a positive electrode electrolyte pump to initiate a positive electrode reaction at the surface of the felt positive electrode, and the negative electrode electrolyte is supplied into the negative electrode chamber by a negative electrode electrolyte pump to initiate a negative electrode reaction at the surface of the felt negative electrode to carry out discharge, thereby allowing for extraction of electricity outside the battery. On the other hand, charging is carried out by energizing the electrodes from the outside while allowing the positive electrode electrolyte and the negative electrode electrolyte to flow into the positive electrode chamber and the negative electrode chamber, respectively. The formulas representing the reactions at the positive electrode and the negative electrode are as follows.

Positive Electrode:

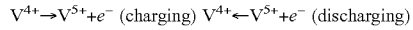
$V^{4+} \rightarrow V^{5+}+e^-$ (charging) $V^{4+} \leftarrow V^{5+}+e^-$ (discharging)

Negative Electrode:

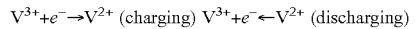
$V^{3+}+e^- \rightarrow V^{2+}$ (charging) $V^{3+}+e^- \leftarrow V^{2+}$ (discharging)

In reality, however, it is assumed that $V^{4+}$ is present as $VO^{2+}$, and $V^{5+}$ is present as $VO_2^+$, each in a hydrated state or in a state coordinated with sulfate radical.

The vanadium redox battery as described above has the following advantageous properties as compared to other batteries.

1. The battery is operable at room temperature.
2. The battery is extremely stable and has a long cycle life.
3. The battery has no explosive/flammable properties due to containing no hazardous material.
4. The amount of electricity storage in the battery can be easily increased, due to its active material being liquid and the liquid being stored in a tank.
5. The state of charging and discharging of the battery can be controlled by observing the composition of the electrolytes.
6. The battery can be easily regenerated even if a plurality of ions exists in mixture.

However, the energy density of the vanadium redox flow battery is lower as compared to other secondary batteries, since the saturated dissolved concentration of the vanadium active material is not so high, and the cell voltage of the single cell is not so high due to the electrolyte being an aqueous solution. At the same time, although the vanadium redox flow battery has a significantly high instantaneous output, it has a practical current density of about several 10 mA/cm², with 200 mA/cm² being the upper limit, because the internal resistance of the battery, particularly the flow resistance of the electrolyte inside the electrodes, is too high to continuously carry out charging and discharging at a high current. One of the causes for this is the resistance against the flow of the electrolyte in the carbon felt used for the electrodes. However, if the felt density is decreased in order to reduce the resistance, the electron conductivity is reduced. In other words, they are in a trade-off relationship.

CITATION LIST

Patent Documents

Patent Document 1: JP 62-186473 A
Patent Document 2: JP 2002-367657 A

SUMMARY OF THE INVENTION

The present inventors have determined that one of the causes for not being able to obtain sufficient output with a conventional redox flow battery is a felt material made of carbon used for the electrodes. Further, although Patent Document 1 describes that titanium coated with $IrO_2$ is excellent as the electrode material for the positive electrode, it has been found out that the repeated charging and discharging in a highly concentrated sulfuric acid bath for a prolonged period of time causes the corrosion of the substrate titanium and the deterioration of the electrode, thereby reducing the durability. This is assumed to be because the substrate titanium is exposed to the sulfuric acid at portions thereof where $IrO_2$ is not coated or pin holes therein, and an original passivation function provided by its oxide film cannot be sufficiently maintained in the sulfuric acid.

The present inventors have thus found out that the use of material obtained by coating dimensionally stable zirconium with a noble metal as the positive electrode material allows the positive electrode to maintain sufficient durability, even in a highly concentrated sulfuric acid bath. The present inventors have also found out that, in cases where titanium coated with a noble metal or a compound thereof is used as the positive electrode material, it is possible to maintain sufficient durability of the positive electrode even in a sulfuric acid bath, by adding nitric acid to the electrolyte as an oxidant. The present invention has been completed based on these findings.

One of the examples of the present invention is a redox flow battery comprising a positive electrode, a negative electrode and a separation membrane, wherein a positive electrode electrolyte composed of an aqueous solution containing vanadium ions is supplied into a positive electrode chamber, and a negative electrode electrolyte composed of an aqueous solution containing vanadium ions is supplied into a negative electrode chamber, to carry out charging and discharging of the battery; and wherein zirconium or titanium coated with a noble metal or a compound thereof is used as a positive electrode material, and when the positive electrode material is zirconium coated with a noble metal or a compound thereof, the positive electrode electrolyte and the negative electrode electrolyte contain sulfuric acid; and when the positive electrode material is titanium coated with a noble metal or a compound thereof, the positive electrode electrolyte contains nitric acid.

Effect of the Invention

The redox flow battery according to the present invention exhibits extremely excellent effects that it has a high charging and discharging efficiency due to its capability of being continuously charged and discharged even at an extremely high current, as well as a high energy density. Accordingly, the present invention serves to provide a battery suitable for applications such as storage of electricity.

BRIEF DESCRIPTION OF THE DRAWINGS

FIG. 1 is a schematic diagram of one aspect (single cell) of the redox flow battery according to the invention, showing a cross section of the single cell.

FIG. 2 is a schematic diagram showing a partial perspective view of the single cell shown in FIG. 1.

FIG. 3 is a schematic diagram of one aspect (cell stack) of the redox flow battery according to the invention, showing a part of the cross section of the cell stack seen from the side.

FIG. 4 is a schematic diagram showing a partial perspective view of the cell stack shown in FIG. 3.

FIG. 5 is a schematic diagram showing an example of a lattice-like partition plate used in one aspect of the redox flow battery according to the invention, wherein the intersections of the lattice are projected portions and the centers of the individual cells of the lattice (indicated as "○") are recessed portions.

MODE FOR CARRYING OUT THE INVENTION

The redox flow battery according to the present invention (hereinafter, also referred to as "the battery of the invention") will now be described in detail.

The battery of the invention is a redox flow battery comprising a positive electrode, a negative electrode and a separation membrane, wherein a positive electrode electrolyte composed of an aqueous solution containing vanadium ions is supplied into a positive electrode chamber, and a negative electrode electrolyte composed of an aqueous solution containing vanadium ions is supplied into a negative electrode chamber, to carryout charging and discharging of the battery; and wherein zirconium or titanium coated with a noble metal or a compound thereof is used as a positive electrode material, and when the positive electrode material is zirconium coated with a noble metal or a compound thereof, the positive electrode electrolyte and the negative electrode electrolyte contain sulfuric acid; and when the positive electrode material is titanium coated with a noble metal or a compound thereof, the positive electrode electrolyte contains nitric acid.

The first aspect of the battery of the invention (hereinafter, also referred to as "the battery (1) of the invention")) is a redox flow battery comprising a positive electrode, a negative electrode and a separation membrane; wherein a positive electrode electrolyte composed of an aqueous solution of sulfuric acid containing vanadium ions is supplied into a positive electrode chamber, and a negative electrode electrolyte composed of an aqueous solution of sulfuric acid containing vanadium ions is supplied into a negative electrode chamber, to carry out charging and discharging of the battery; and wherein zirconium coated with a noble metal or a compound thereof is used as a positive electrode material. The use of zirconium coated with a noble metal or a compound thereof as the positive electrode material allows the positive electrode to maintain sufficient durability even in a highly concentrated sulfuric acid bath.

The second aspect of the battery of the invention (hereinafter, also referred to as "the battery (2) of the invention")) is a redox flow battery comprising a positive electrode, a negative electrode and a separation membrane; wherein a positive electrode electrolyte composed of an aqueous solution containing vanadium ions is supplied into a positive electrode chamber, and a negative electrode electrolyte composed of an aqueous solution containing vanadium ions is supplied into a negative electrode chamber, to carryout charging and discharging of the battery; wherein titanium coated with a noble metal or a compound thereof is used as a positive electrode material; and wherein the positive electrode electrolyte contains nitric acid. This allows the positive electrode to maintain sufficient durability even in a sulfuric acid bath.

Examples of the "zirconium" in the battery (1) of the invention include, unless otherwise specified, zirconium metals substantially consisting of zirconium, and zirconium alloys containing metals other than zirconium within the range of less than 50 atomic %. Examples of the metals other than zirconium include titanium, tantalum, copper, tin, iron, nickel, chromium, hafnium, cobalt, niobium, aluminum, gallium and molybdenum. The zirconium alloys are alloys containing at least one type of metal selected from the metals other than zirconium.

The components and the composition of the zirconium alloy are not particularly limited. Preferred is a zirconium alloy which does not elicit side reactions other than the positive electrode reaction and the negative electrode reaction, such as dissolution reaction, and examples thereof include:

zircaloy alloys such as zircaloy-1 containing 1.94 atomic % of tin, and zircaloy-4 containing 1.12 atomic % of tin, 0.34 atomic % of iron, 0.175 atomic % of chromium, and 0.005 atomic % of hafnium;

zirconium noncrystalline alloys having a composition represented by $Zr_{1-a-b-c}A_a$ [(Fe, Co, Ni) Cu]$_b X_c$ [wherein A is one type or a two types of elements selected from Al and Ga; X is Nb, Ta or Ti, and the ratio of (Ni, Co, Fe) to Cu is 1:8 to 2:1; a to c represent atomic ratio and satisfy the following relations: $0.2<a+b+c<0.6$, $a=0.05$ to $0.2$, and $b=0.15$ to $0.45$, when X is Nb, $0<c\leq 0.25$, when X is Ta, $0<c\leq 0.15$, and when X is Ti, $0<c\leq 0.1$]; and zirconium alloys containing at least one type of element selected from titanium and tantalum in an amount less than 50 atomic %.

"Titanium" in the battery (2) of the invention may be pure titanium or a titanium alloy. Examples of the pure titanium include JIS Type 1, JIS Type 2, JIS Type 3, and JIS Type 4. Representative examples of the titanium alloy include JIS Type 60 containing Al and V, which is one type of α-β alloys, namely Ti-6Al-4V commonly referred to as 6-4 alloy; Ti-5Al-2.5Sn containing Al and Sn, which is one type of α-alloys; and Ti-15V-3Cr-3Sn-3Al containing V, Cr, Sn and Al, which is one type of β-alloys. In other words, titanium used in the present invention may be pure titanium or a titanium alloy, as long as it contains 70% or more of titanium in percentage by mass.

Zirconium (hereinafter, also referred to as a "zirconium substrate") which is used as the substrate of the positive electrode material in the battery (1) of the invention, and titanium (hereinafter, also referred to as a "titanium substrate") which is used as the substrate of the positive electrode material in the battery (2) of the invention may be formed in any shape without particular limitations. Preferred is a substrate obtained by pressing an expand metal in the surface direction to flatten, followed by bake plating with a noble metal or a compound thereof in the air, since it does not cause damages to the separation membrane due to friction or the like. For example, a perforated metal made of a zirconium plate or a titanium plate having an increased void content, or a woven zirconium fiber material or a woven titanium fiber material may be used as the substrate.

The noble metal or the compound thereof to be coated (plated) is not particularly limited, and preferred are those which allow for a rapid positive electrode reaction, such as $IrO_2$, $RuO_2$, $(Ru-Ti)O_2$, PdO, Pt-Ir, and $(Ru-Sn)O_2$. Of these, $IrO_2$, PtIr and $RuO_2$ are particularly preferred, because they allow for a high degree of reactivity and durability. It is also possible to add other elements such as S, Co and Mn in order to improve the catalytic effect of the electrode.

As the negative electrode material in the battery (1) of the invention, a zirconium substrate coated with a noble metal or a compound thereof can be used, as with the positive electrode material. However, carbon felt may also be used so as to allow a rapid electrode reaction without reducing the hydrogen overvoltage. Further, a zirconium substrate coated with a carbon material is also preferred, in view of durability. Since the use of carbon felt may possibly cause a problem in terms of fluid resistance as described above, a mesh-like zirconium substrate coated (plated) with a noble metal or a compound thereof, or a zirconium substrate coated with a carbon material is more preferred.

As the negative electrode material in the battery (2) of the invention, a titanium substrate coated with a noble metal or a compound thereof can be used, as with the positive electrode material. However, carbon felt may also be used so as to allow a rapid electrode reaction without lowering the hydrogen overvoltage. Further, a titanium substrate coated with a carbon material is also preferred, in view of durability. Since the use of carbon felt may possibly cause a problem in terms of fluid resistance as described above, a mesh-like titanium substrate coated (plated) with a noble metal or a compound thereof, or a titanium substrate coated with a carbon material is more preferred.

"Titanium" as used herein may be pure titanium or a titanium alloy as long as it contains 70% or more of titanium in percentage by mass, as described in the above described positive electrode material.

The positive electrode electrolyte and the negative electrode electrolyte used in the battery (1) of the invention are each an aqueous solution of sulfuric acid containing vanadium ion. More specifically, the electrolytes are each an aqueous sulfuric acid solution of a vanadium salt such as vanadium sulphate or vanadyl sulfate, and the concentration of vanadium ions in the aqueous solution is preferably 0.8 mol/L to 5.0 mol/L, and more preferably 1.5 mol/L to 3.5 mol/L. Too low a vanadium ion concentration reduces the energy density of the battery. On the other hand, too high a vanadium ion concentration increases the viscosity of the electrolyte and thereby increases the resistance of the battery cell, resulting in a low electrical efficiency. The vanadium salt is dissolved in an aqueous solution of sulfuric acid, and the concentration of the sulfuric acid in the aqueous solution is preferably 1.0 mol/L to 8.0 mol/L, and more preferably 1.5 mol/L to 5.0 mol/L, but not particularly limited thereto.

The positive electrode electrolyte and the negative electrode electrolyte used in the battery (2) of the invention are each an aqueous solution containing vanadium ion. The positive electrode electrolyte is an aqueous sulfuric acid solution of a vanadium salt such as vanadium sulphate or vanadyl sulfate, to which nitric acid is added. Such an electrolyte can also be used as the negative electrode electrolyte. Too low a vanadium ion concentration reduces the energy density of the battery. On the other hand, too high a vanadium ion concentration increases the viscosity of the electrolyte and thereby increases the resistance of the battery cell, resulting in a low electrical efficiency. The vanadium salt is dissolved in an aqueous solution of sulfuric acid and nitric acid, and the concentration of these acids in the aqueous solution is preferably 1.0 mol/L to 8.0 mol/L, and more preferably 1.5 mol/L to 5.0 mol/L, but not particularly limited thereto. The amount of nitric acid added is preferably 0.01 mass % or more, more preferably 0.5 mass % or more, still more preferably 2 mass % or more, and most preferably 5 mass % or more, with respect to the total amount of the electrolyte. It should be noted, however, that there are cases where nitric acid may cause oxidation of carbon at a high temperature, and where generated nitroyl ions may cause an electrophilic substitution reaction against an aromatic compound or the like to enhance nitration, resulting in the deterioration of organic matter such as a gasket or fixing plate. Therefore, the amount of nitric acid added is preferably 15 mass % or less, more preferably 12 mass % or less, and most preferably 10 mass % or less.

In the battery of the invention, the positive electrode electrolyte may be in a state where quadrivalent and pentavalent vanadium ions coexist, or a state where pentavalent vanadium ions solely exist, during the charging. The concentration of the pentavalent vanadium ions in the positive electrode electrolyte when fully charged is preferably 1.0 mol/L to 4.0 mol/L, and more preferably 1.5 mol/L to 3.5 mol/L. The concentration of the pentavalent vanadium ions in the positive electrode electrolyte when fully charged is preferably 60% or more and 99% or less, and more preferably 75% or more and 97% or less, with respect to the total concentration of the vanadium ions.

Further, in the battery of the invention, the positive electrode electrolyte may be in a state where quadrivalent and pentavalent vanadium ions coexist, a state where quadrivalent vanadium ions solely exist, or a state where quadrivalent and trivalent vanadium ions coexist, during the discharging. The concentration of the quadrivalent vanadium ions in the positive electrode electrolyte when fully discharged is preferably 0.8 mol/L to 4.5 mol/L, and more preferably 1.5 mol/L to 3.5 mol/L. The concentration of the quadrivalent vanadium ions in the positive electrode electrolyte when fully discharged is preferably 65% or more and 99% or less, and more preferably 75% or more and 96% or less, with respect to the total concentration of the vanadium ions. The concentration of the trivalent vanadium ions in the positive electrode electrolyte when fully discharged is preferably 20% or less, and more preferably 5% or less, with respect to the total concentration of the vanadium ions.

In the battery of the invention, the negative electrode electrolyte may be in a state where trivalent and divalent vanadium ions coexist, or a state where divalent vanadium ions solely exist, during the charging. The concentration of the divalent vanadium ions in the negative electrode electrolyte when fully charged is preferably 1.0 mol/L to 4.0 mol/L, and more preferably 1.5 mol/L to 3.5 mol/L. The concentration of the divalent vanadium ions in the negative electrode electrolyte when fully charged is preferably 70% or more and 97% or less, and more preferably 75% or more and 96% or less, with respect to the total concentration of the vanadium ions.

Further, in the battery of the invention, the negative electrode electrolyte may be in a state where trivalent and divalent vanadium ions coexist, a state where divalent vanadium ions solely exist, or a state where quadrivalent and trivalent vanadium ions coexist, during the discharging. The concentration of the trivalent vanadium ions in the negative electrode electrolyte when fully discharged is preferably 1.0 mol/L to 4.0 mol/L, and more preferably 1.5 mol/L to 3.5 mol/L. The concentration of the trivalent vanadium ions in the negative electrode electrolyte when fully discharged is preferably 65% or more and 98% or less, and more preferably 75% or more and 96% or less, with respect to the total concentration of the vanadium ions. Further, the concentration of the quadrivalent vanadium ions in the negative electrode electrolyte when fully discharged is preferably 20% or less, and more preferably 5% or less, with respect to the total concentration of the vanadium ions.

The separation membrane used in the battery of the invention is preferably an ion exchange membrane composed of an organic polymer, and may be a cation exchange membrane or an anion exchange membrane.

Examples of the cation exchange membrane include a cation exchange membrane obtained by sulfonation of a styrene-divinylbenzene copolymer, a cation exchange membrane obtained by introducing a sulfonic acid group to a copolymer of tetrafluoroethylene and perfluorosulfonyl ethoxyvinyl ether, a cation exchange membrane composed of a copolymer of tetrafluoroethylene and perfluorovinyl ether containing a carboxyl group in its side chain, and a cation exchange membrane obtained by introducing a sulfonic acid group to an aromatic polysulfone copolymer.

Examples of the anion exchange membrane include an anion exchange membrane obtained by introducing a chloromethyl group to a styrene-divinylbenzene copolymer followed by amination, an anion exchange membrane obtained by quaternary pyridination of a vinylpyridine-divinylbenzene copolymer, and an anion exchange membrane obtained by introducing a chloromethyl group to an aromatic polysulfone copolymer followed by amination.

Next, examples of the structure of the battery of the invention will be described, and then a more specific description will be given with reference to the drawings. However, the present invention is not necessarily limited to these structures, as long as the basic concept is maintained.

In the case of a single cell battery, which is one aspect of the present the invention, for example, the positive electrode material is formed into the shape of a box or a bag, and the positive electrode chamber is formed therein. The portion of the positive electrode material close to or in contact with the separation membrane is referred to as a separation membrane electrode plate on the positive electrode side, and the separation membrane electrode plate is formed in the shape of a porous or mesh-like plate so as to allow electrolyte and ions to pass therethrough. Further, a hole or a slit is provided at each of the lower side and the upper side of the positive electrode material, and the electrolyte is allowed to flow into and flow out of the positive electrode chamber through the holes. With this arrangement, the flow resistance of the fluid (electrolyte) which has been a problem associated with a conventional felt electrode can be reduced, thereby allowing for a large amount of the electrolyte to flow into the positive electrode chamber. As with the positive electrode material, the negative electrode material can also be formed in the shape of a box or a bag, and the negative electrode chamber is formed therein. The portion of the negative electrode material close to or in contact with the separation membrane is referred to as a separation membrane electrode plate on the negative electrode side, and the separation membrane electrode plate is formed in the shape of a porous or mesh-like plate so as to allow electrolyte and ions to pass therethrough. Further, a hole or a slit is provided at each of the lower side and the upper side of the negative electrode material, and the electrolyte is allowed to flow into and flow out of the negative electrode chamber through the holes.

On the other hand, in the case of a cell stack battery, which is one aspect of the present invention, each of the positive electrodes and the negative electrodes may be those obtained by forming the positive electrode material and the negative electrode material in the shape of a box or a bag, respectively, as with the case of the single cell battery; or alternatively, they may each be in the form of a plate consisting solely of the separation membrane electrode plate. In either case, it is necessary that electrically conductive bipolar plates which do not allow the electrolytes to pass therethrough be disposed at the boundaries of the respective cells.

In either case of the single cell or the cell stack, a portion(s) of the material constituting the positive electrode chamber(s) and the negative electrode chamber(s) may be formed with a material such as non-electrically conductive synthetic resin. However, it is necessary to allow electrical conduction between each of the separation membrane electrode plates and the bipolar plates.

FIG. 1 is a schematic diagram of one aspect (single cell) of the battery of the invention, showing the cross section of the single cell seen from the side. FIG. 2 is a schematic diagram illustrating a partial perspective view of the single cell shown in FIG. 1. The battery shown in FIG. 1 and FIG. 2 includes: a positive electrode including a separation membrane electrode plate 1 on the positive electrode side obtained by coating a noble metal or a compound thereof on the surface of a zirconium substrate (in the case of the battery (1) of the invention) or a titanium substrate (in the case of the battery (2) of the invention), a positive electrode current collector plate 2 and a positive electrode chamber 3; a negative electrode including a separation membrane electrode plate 9 on the negative electrode side, a negative electrode current collector plate 10 and a negative electrode chamber 11; and a separation membrane 6 disposed between the positive electrode and the negative electrode. The separation membrane electrode plate 1 on the positive electrode side and the separation membrane electrode plate 9 on the negative electrode side are electrically connected to the positive electrode current collector plate 2 and the negative electrode current collector plate 10, respectively, and the separation membrane electrode plate 1 on the positive electrode side and the separation membrane electrode plate 9 on the negative electrode side are each formed in the shape of a porous or mesh-like plate. The battery has a structure in which:

a positive electrode electrolyte inflow passage 4 through which the positive electrode electrolyte is supplied is disposed at the lower portion of the positive electrode chamber 3;

a positive electrode electrolyte outflow passage 5 through which the positive electrode electrolyte flows out of the positive electrode chamber 3 is disposed at the upper portion of the positive electrode chamber 3;

a negative electrode electrolyte inflow passage 12 through which the negative electrode electrolyte is supplied is disposed at the lower portion of the negative electrode chamber 11;

a negative electrode electrolyte outflow passage 13 through which the negative electrode electrolyte flows out of the negative electrode chamber 11 is disposed at the upper portion of the negative electrode chamber 11;

the positive electrode electrolyte inflow passage 4 and the positive electrode chamber 3 are connected such that the positive electrode electrolyte is capable of flowing through the positive electrode electrolyte inflow passage 4 into the positive electrode chamber 3;

the positive electrode electrolyte outflow passage 5 and the positive electrode chamber 3 are connected such that the positive electrode electrolyte is capable of flowing out of the positive electrode chamber 3 into the positive electrode electrolyte outflow passage 5;

the negative electrode electrolyte inflow passage 12 and the negative electrode chamber 11 are connected such that the negative electrode electrolyte is capable of flowing through the negative electrode electrolyte inflow passage 12 into the negative electrode chamber 11; and the negative electrode electrolyte outflow passage 13 and the negative electrode chamber 11 are connected such that the negative electrode electrolyte is capable of flowing out of the negative electrode chamber 11 into the negative electrode electrolyte outflow passage 13.

In the single cell battery shown in FIG. 1 and FIG. 2, the positive electrode is in the form of a box. The positive electrode electrolyte inflow passage 4 disposed at the lower portion of the box and the positive electrode electrolyte outflow passage 5 disposed at the upper portion of the box usually have a width which is the same as the thickness of the positive electrode, and are provided with a positive electrode electrolyte inlet nozzle 7 and a positive electrode electrolyte outlet nozzle 8, respectively.

The negative electrode has the same shape and the structure as the positive electrode, and the negative electrode electrolyte inflow passage 12 and the negative electrode electrolyte outflow passage 13 are provided with a negative electrode electrolyte inlet nozzle 14 and a negative electrode electrolyte outlet nozzle 15, respectively.

In order to maintain the thickness of the positive electrode chamber 3 and the negative electrode chamber 11, it is preferred that each of the positive electrode chamber 3 and the negative electrode chamber 11 be provided with a spacer (s) made of zirconium (in the case of the battery (1) of the invention) or titanium (in the case of the battery (2) of the invention). Further, it is preferred that gaskets 16 made of a material having a good corrosion resistance, such as an ethylene-propylene-diene rubber (EPDM), be provided between the respective flanges for fixing the current collector plates, so that the spaces in the chambers can be adjusted. Note, however, that when a porous carbon electrode such as carbon felt is used as the negative electrode, the gaskets 16 serve as spacers for adjusting the thickness of the negative electrode chamber, namely the felt thickness. In this case, accordingly, the negative electrolyte inflow passage and the outflow passage disposed at the lower portion and the upper portion of the negative electrode, respectively, may not be provided, leaving the spaces therefor as they are. The negative electrode electrolyte is allowed to flow into the felt electrode via the nozzle opening provided in the flange, passing through the space beneath the felt, and the negative electrode electrolyte is discharged through the space above the felt. The cell is covered and pressed with insulating fixing plates 17, such as vinyl chloride plates, and fixed with bolts or the like at both sides of the cell.

Next, the structure of the cell stack battery comprising a plurality of unit cells stacked in series, which is one aspect of the battery of the invention, will be described with reference to FIG. 3 and FIG. 4.

FIG. 3 is a schematic diagram of the cell stack, showing the cross section of the cell stack seen from the side. In the cell stack, each of the separation membrane electrode plates 1 on the positive electrode side is disposed on the left side of each of the separation membranes 6, and each of the separation membrane electrode plates 9 on the negative electrode side is disposed on the right side of each of the separation membranes 6.

FIG. 4 is a schematic diagram of the cell stack shown in and FIG. 3, showing a partial perspective view of the cell stack. A wave-shaped bipolar plate 18 is disposed in contact with the separation membrane electrode plate 1 on the positive electrode side and the separation membrane electrode plate 9 on the negative electrode side, and the positive electrode chambers 3 and the negative electrode chambers 11 are disposed alternately such that triangle columns are aligned in the direction of the height of the electrode.

As described above, in the cell stack, it is preferred that the positive electrodes and the negative electrodes of the respective unit cells be partitioned by the respective bipolar plates 18, wherein each of the bipolar plates 18 has recessed portions and projected portions, with at least a portion of the recessed portions being in contact with one of the separation membrane electrode plates, and at least a portion of the projected portions being in contact with another one of the separation membrane electrode plates, in terms of maintaining the collection of electricity and of effectively separating the positive electrode electrolyte and the negative electrode electrolyte. For example, when the bipolar plates have a shape in which polygonal pyramids are aligned sequentially in the form of a wave, the collection of electricity and partitioning can both be achieved by allowing the respective apices of the pyramids in each of the bipolar plates to be in contact with the adjacent separation membrane electrode plate 1 on the positive electrode side or the separation membrane electrode plate 9 on the negative electrode side. At the same time, it also allows the electrolytes to flow without resistance.

The shape of the bipolar plates 18 is not particularly limited as long the above mentioned effects can be achieved. However, it is preferred that the bipolar plates each be a wave-shaped plate, or a plate having the shape of a lattice, when drawn on a plane, in which the intersections of the lattice constitute the projected portions and the centers of the individual cells of the lattice constitute the recessed portions (see FIG. 5). Further, the material of the bipolar plates 18 is preferably zirconium in the battery (1) of the invention, and titanium in the battery (2) of the invention.

In each of the unit cells, the respective positive electrode chambers 3 partitioned by the adjacent wave-shaped bipolar plate 18, and the respective negative electrode chambers 11 partitioned by the adjacent wave-shaped bipolar plate 18, may or may not be in communication between themselves. However, in order to allow reactions to proceed efficiently throughout the entire cell stack battery, it is preferred that, in each of the unit cells, the respective positive electrode chambers communicate with one another and the respective negative electrode chambers communicate with one another, so as to allow fluid communication between themselves. In this case, the triangle columns constituting the electrode chambers have a structure in which they are not perfectly aligned at places. Since the wave-shaped bipolar plates 18 are capable of fixing the thickness of the interior of the electrode chambers, in this case, spacers are not required inside the positive electrode chambers 3 and the negative electrode chambers 4.

The flow paths of the electrolytes and the structure of the flow paths in the cell stack battery are the same as described above for the single cell battery.

The flow of electricity during the charging will now be described. Quadrivalent vanadium ions are oxidized to pentavalent vanadium ions at the separation membrane electrode plate 1 on the positive electrode side, and the released electrons flow toward the separation membrane electrode plate 9 on the negative electrode side through the bipolar plate 18. The electrons are received at the separation membrane electrode plate 9 on the negative electrode side, at its portion(s) in contact with the separation membrane, and trivalent vanadium ions are reduced to divalent vanadium ions. In order to maintain the electrical neutrality of the electrolytes, $H^+$ (hydrogen ions) flow from the side of the positive electrode chamber 3 toward the side of the negative electrode chamber 11 inside the separation membrane.

As described above, a required number of unit cells are stacked to form one module. It is preferred that both ends of this module be covered with insulating materials, so as to press and fix the entire module. The voltage between both ends of this module roughly amounts to that of the unit cell multiplied by the number of the unit cell. In a practical application, the module can be used as it is, or a plurality of modules can be combined in series or in parallel to be used as a battery having a large capacity.

In a conventional battery, the upper limit of the current density during the charging and discharging has been about 200 mA/cm$^2$. In the battery of the invention, however, the fluid resistance inside the positive electrode chamber is very low, due to not using the carbon felt used for the electrodes in a conventional battery, at least for the positive electrode, and therefore, a current density of 500 mA/cm$^2$ or more can be achieved continuously and stably. Accordingly, the invention serves to provide a battery which has a large output and which is extremely promising as a storage battery corresponding to applications such as load-leveling, use as an emergency power source, momentary stop and peak-cut. The battery of the invention can also be used to effectively store the surplus electricity of a solar cell or a wind generator utilizing natural energy.

EXAMPLES

The present invention will now be described specifically based on Examples, but the invention is in no way not limited by the Examples.

Example 1

A single cell as shown in FIG. 1 was prepared. The inlet nozzle 7 of the positive electrode chamber 3 of the cell was connected to a liquid transfer pump for the positive electrode electrolyte with a Teflon (trademark) tube, and the suction side of the liquid transfer pump was connected to a positive electrode electrolyte tank. Further, the outlet nozzle 8 of the positive electrode chamber 3 of the cell and the positive electrode electrolyte tank were connected with a Teflon (trademark) pipe, so that the positive electrode electrolyte flows back through the outlet nozzle 8 into the positive electrode electrolyte tank. In the same manner, the inlet nozzle 14 of the negative electrode chamber 11 was connected to a liquid transfer pump for the negative electrode electrolyte, and the suction side of the liquid transfer pump was connected to a negative electrode electrolyte tank. Further, the outlet nozzle 15 of the negative electrode chamber 11 and the negative electrode electrolyte tank were connected with a Teflon (trademark) pipe, so that the negative electrode electrolyte flows back through the outlet nozzle 15 into the negative electrode electrolyte tank. A Nafion (trademark) 212 membrane was used as the separation membrane 6. One side of the separation membrane 6 was provided with the separation membrane electrode plate 1 on the positive electrode side, obtained by bake coating $IrO_2$ on a plate-like zirconium substrate with a high void content which was formed by pressing an expand metal (wire diameter: 0.5 mm) of zirconium to smooth out its surface; and the other side of the separation membrane 6 was provided with the separation membrane electrode plate 9 on the negative electrode side, obtained by bake plating platinum on a similarly smooth-surfaced, plate-like zirconium substrate with a high void content. The electrode chambers, which are the positive electrode chamber and the negative electrode chamber, were each formed to have an oblong shape with a width of 3 cm and a length of 15 cm, and a structure in which the electrolyte flows in from the lower portion and flows out from the upper portion of the chamber. The thickness of each of the positive electrode chamber and the negative electrode chamber was 3 mm, excluding the thickness of the plates constituting the electrode chamber. Further, the electrode chambers were formed in the shape of a box, as shown in FIG. 2, constituted of the above described separation membrane electrode plates, spacers made of zirconium, and zirconium plates as the current collector plates. The zirconium used in Example 1 is a zirconium metal substantially consisting of zirconium, which contains zirconium in an amount of 99 mass % or more.

An aqueous solution of 3.0 mol/L $H_2SO_4$ having a quadrivalent vanadium ion concentration of 2.0 mol/L was used as the positive electrode electrolyte. An aqueous solution of 3.0 mol/L $H_2SO_4$ having a trivalent vanadium ion concentration of 1.8 mol/L was used as the negative electrode electrolyte. The amount of each of the electrolytes was 120 mL.

First, while supplying the positive electrode electrolyte and the negative electrode electrolyte into the positive electrode chamber 3 and the negative electrode chamber 11 of the single cell, respectively, and allowing the electrolytes to circulate at 18 mL/min, the charging of the battery was carried out at a current density of 100 mA/cm². The charging was terminated when the voltage reached 1.6 V, followed by discharging at 100 mA/cm². The discharging was terminated when the voltage reached 1.0 V. Then, 10 cycles of charging and discharging were repeated, and the battery efficiency was measured at each of the cycles. The battery efficiency was calculated according to the following equation (the same applies hereinafter).

Battery efficiency (%)={discharging voltage (V)× discharging current (A)×discharging time (h)}/ {charging voltage (V)×charging current (A)× charging time (h)}×100

The battery efficiency and the liquid energy density at the 10th cycle were 91% and 28 kWh/m³, respectively. Then the current density was increased to 600 mA/cm², and the circulating volume of each of the electrolytes was also increased to 35 mL/min, from the 11th cycle onwards, and the experiment was continued. As a result, the battery efficiency and the liquid energy density at the 20th cycle were 88% and 22 kWh/m³, respectively.

Example 2

A cell stack as shown in FIG. 3 was prepared. Nafion (trademark) 212 membranes were used as the separation membranes 6. The right side of each of the separation membranes 6 was provided with the separation membrane electrode plate 1 on the positive electrode side, obtained by bake coating $IrO_2$ on a plate-like zirconium substrate with a high void content which was formed by pressing an expand metal (wire diameter: 0.5 mm) of zirconium to smooth out its surface; and the left side of each of the separation membranes 6 was provided with the separation membrane electrode plate 9 on the negative electrode side, obtained by bake plating platinum on a similarly smooth-surfaced, plate-like zirconium substrate with a high void content. The separation membrane electrode plates 1 on the positive electrode side and the separation membrane electrode plates 9 on the negative electrode side were each formed to have an area of 210 mm width×297 mm length. Between each of the separation membrane electrode plates 1 on the positive electrode side and each of the separation membrane electrode plates 9 on the negative electrode side, each of the wave-shaped bipolar plates 18 (thickness: 0.5 mm) made of zirconium was disposed so as to be in contact with the adjacent separation membrane electrode plates 1 and 9, and the positive electrode chambers 3 and the negative electrode chambers 11 partitioned by each of the wave-shaped bipolar plates 18 were alternately disposed so that the triangle columns were aligned in the direction of the height of the electrodes. The thickness (3 mm) of the interior of the electrode chambers was fixed by the wave-shaped bipolar plates. As the current collector plate, a zirconium plate having roughly the same area as the separation membrane electrode plates was disposed at the position shown in FIG. 3. The flow paths of the electrolytes and the structure of the flow paths were the same as those described for the single cell battery used in Example 1. Twenty unit cells were stacked to form a module. Both ends of this module were covered with insulating vinyl chloride plates, and the entire module was pressed and fixed with through bolts. The zirconium used in Example 2 is a zirconium metal substantially consisting of zirconium, which contains zirconium in an amount of 99 mass % or more.

An aqueous solution of 3.0 mol/L $H_2SO_4$ having a quadrivalent vanadium ion concentration of 2.0 mol/L was used as the positive electrode electrolyte, and an aqueous solution of 3.0 mol/L $H_2SO_4$ having a trivalent vanadium ion concentration of 1.8 mol/L was used as the negative electrode electrolyte. The amount of each of the electrolytes was 25 L.

First, while supplying the positive electrode electrolyte and the negative electrode electrolyte into the positive electrode chambers 3 and the negative electrode chambers 11 of the cell stack, respectively, and allowing the electrolytes to circulate at 5.0 L/min, the charging of the battery was carried out at a current density of 100 mA/cm². The charging was terminated when the voltage reached 1.6 V, followed by discharging at 100 mA/cm². The discharging was terminated when the voltage reached 1.0 V. Then, 10 cycles of charging and discharging were repeated, and the battery efficiency was measured at each of the cycles.

The battery efficiency and the liquid energy density at the 10th cycle were 89% and 27 kWh/m³, respectively. Then the current density was increased to 600 mA/cm², and the circulating volume of each of the electrolytes was also increased to 10 L/min, from the 11th cycle onwards, and the experiment was continued. As a result, the battery efficiency and the liquid energy density at the 20th cycle were 88% and 21 kWh/m³, respectively.

Example 3

A single cell was prepared and an experiment was carried out in the same manner as in Example 1, except that zircaloy-4 alloy was used instead of the zirconium used in Example 1. As a result, the battery efficiency and the liquid energy density at the 10th cycle were 91% and 28 kWh/m³, respectively, which were the same as those obtained in Example 1. Further, the battery efficiency and the liquid energy density at the 20th cycle were also the same as those obtained in Example 1. After the experiment, the surfaces of the electrodes and the surfaces thereof at which the zircaloy-4 alloy was exposed to the electrolyte were observed with a light microscope, but no corrosion was observed.

Example 4

A single cell was prepared and an experiment was carried out in the same manner as in Example 1, except that a smooth, plate-like zirconium substrate with a high void content, coated with carbon by an ionized deposition method under a high-vacuum was used as the separation membrane electrode plate on the negative electrode side, instead of the electrode plate on the negative electrode side used in Example 1. As a result, the battery efficiency and the liquid energy density at the 10th cycle were 95% and 29 kWh/m³, respectively. Then the experiment was continued under the same conditions as in Example 1, from the 11th cycle onwards. As a result, the battery efficiency and the liquid energy density at the 20th cycle were 91% and 23 kWh/m³, respectively.

Example 5

A single cell as shown in FIG. 1 was prepared. The inlet nozzle 7 of the positive electrode chamber 3 of the cell was connected to the liquid transfer pump for the positive electrode electrolyte with a Teflon (trademark) tube, and the suction side of the liquid transfer pump was connected to the positive electrode electrolyte tank. Further, the outlet nozzle 8 of the positive electrode chamber 3 of the cell and the positive electrode electrolyte tank were connected with a Teflon (trademark) pipe, so that the positive electrode electrolyte flows back through the outlet nozzle 8 into the positive electrode electrolyte tank. In the same manner, the inlet nozzle 14 of the negative electrode chamber 11 was connected to the liquid transfer pump for the negative electrode electrolyte, and the suction side of the liquid transfer pump was connected to the negative electrode electrolyte tank. Further, the outlet nozzle 15 of the negative electrode chamber 11 and the negative electrode electrolyte tank were connected with a Teflon (trademark) pipe, so that the negative electrode electrolyte flows back through the outlet nozzle 15 into the negative electrode electrolyte tank. A Nafion (trademark) 212 membrane was used as the separation membrane 6. One side of the separation membrane 6 was provided with the separation membrane electrode plate 1 on the positive electrode side, obtained by bake coating $IrO_2$ on a plate-like titanium substrate with a high void content which was formed by pressing an expand metal (wire diameter: 0.5 mm) of titanium to smooth out its surface; and the other side of the separation membrane 6 was provided with the separation membrane electrode plate 9 on the negative electrode side, obtained by bake plating platinum on a similarly smooth-surfaced, plate-like titanium substrate with a high void content. The electrode chambers, which are the positive electrode chamber and the negative electrode chamber, were each formed to have an oblong shape with a width of 3 cm and a length of 15 cm, and a structure in which the electrolyte flows in from the lower portion and flows out from the upper portion of the chamber. The thickness of each of the positive electrode chamber and the negative electrode chamber was 3 mm, excluding the thickness of the plates constituting the electrode chamber. Further, the electrode chambers were formed in the shape of a box, as shown in FIG. 2, constituted of the separation membrane electrode plates, spacers made of titanium, and titanium plates as the current collector plates. As the above mentioned titanium, pure titanium JIS Type 2 was used.

An aqueous solution of 3.0 mol/L $H_2SO_4$ having a quadrivalent vanadium ion concentration of 2.0 mol/L, to which nitric acid was added to a concentration of 5 mass %, was used as the positive electrode electrolyte. An aqueous solution of 3.0 mol/L $H_2SO_4$ having a trivalent vanadium ion concentration of 1.8 mol/L, to which nitric acid was added to a concentration of 5 mass %, was used as the negative electrode electrolyte. The amount of each of the electrolytes was 120 mL.

First, while supplying the positive electrode electrolyte and the negative electrode electrolyte into the positive electrode chamber 3 and the negative electrode chamber 11 of the single cell, respectively, and allowing the electrolytes to circulate at 18 mL/min, the charging of the battery was carried out at a current density of 100 mA/cm². The charging was terminated when the voltage reached 1.6 V, followed by discharging at 100 mA/cm². The discharging was terminated when the voltage reached 1.0 V. Then, 10 cycles of charging and discharging were repeated, and the battery efficiency was measured at each of the cycles.

The battery efficiency and the liquid energy density at the 10th cycle were 91% and 28 kWh/m³, respectively. Then the current density was increased to 600 mA/cm², and the circulating volume of each of the electrolytes was also increased to 35 mL/min, from the 11th cycle onwards, and the experiment was continued. As a result, the battery efficiency and the liquid energy density at the 20th cycle were 88% and 22 kWh/m³, respectively.

Example 6

A cell stack as shown in FIG. 3 was prepared. Nafion (trademark) 212 membranes were used as the separation membranes 6. The right side of each of the separation membranes 6 was provided with the separation membrane electrode plate 1 on the positive electrode side, obtained by bake coating $IrO_2$ on a plate-like titanium substrate with a high void content which was formed by pressing an expand metal (wire diameter: 0.5 mm) of titanium to smooth out its surface; and the left side of each of the separation membranes 6 was provided with the separation membrane electrode plate 9 on the negative electrode side, obtained by bake plating platinum on a similarly smooth-surfaced, plate-like titanium substrate with a high void content. The separation membrane electrode plates 1 on the positive electrode side and the separation membrane electrode plates 9 on the negative electrode side were each formed to have an area of 210 mm width×297 mm length. Between each of the separation membrane electrode plates 1 on the positive electrode side and each of the separation membrane electrode plates 9 on the negative electrode side, each of the wave-shaped bipolar plates 18 (thickness: 0.5 mm) made of titanium was disposed so as to be in contact with the adjacent separation membrane electrode plates 1 and 9, and the positive electrode chambers 3 and the negative electrode chambers 11 partitioned by each of the wave-shaped bipolar plates 18 were alternately disposed so that the triangle columns were aligned in the direction of the height of the electrodes. The thickness (3 mm) of the interior of the electrode chambers was fixed by the wave-shaped bipolar plates. As the current collector plate, a titanium plate having roughly the same area as the membrane electrode plates was disposed at the position shown in FIG. 3. The flow paths of the electrolytes and the structure of the flow paths were the same as those described for the single cell battery used in Example 5. Twenty unit cells were stacked to form a module. Both ends of this module were covered with insulating vinyl chloride plates, and the entire module was pressed and fixed with through bolts. As the above mentioned titanium, pure titanium JIS Type 2 was used.

An aqueous solution of 3.0 mol/L $H_2SO_4$ having a quadrivalent vanadium ion concentration of 2.0 mol/L, to which nitric acid was added to a concentration of 2 mass %, was used as the positive electrode electrolyte, and an aqueous solution of 3.0 mol/L $H_2SO_4$ having a trivalent vanadium ion concentration of 1.8 mol/L, to which nitric acid was added to a concentration of 2 mass %, was used as the negative electrode electrolyte. The amount of each of the electrolytes was 25 L.

First, while supplying the positive electrode electrolyte and the negative electrode electrolyte into the positive electrode chambers 3 and the negative electrode chambers 11 of the cell stack, respectively, and allowing the electrolytes to circulate at 5.0 L/min, the charging of the battery was carried out at a current density of 100 mA/cm². The charging was terminated when the voltage reached 1.6 V, followed by discharging at 100 mA/cm². The discharging was terminated when the voltage reached 1.0 V. Then, 10 cycles of charging and discharging were repeated, and the battery efficiency was measured at each of the cycles.

The battery efficiency and the liquid energy density at the 10th cycle were 89% and 27 kWh/m³, respectively. Then the current density was increased to 600 mA/cm², and the circulating volume of each of the electrolytes was also increased to 10 L/min, from the 11th cycle onwards, and the experiment was continued. As a result, the battery efficiency and the liquid energy density at the 20th cycle were 88% and 21 kWh/m³, respectively.

Example 7

A single cell was prepared and an experiment was carried out in the same manner as in Example 5, except that JIS 60 (Ti-6Al-4V) was used as the titanium material for the positive electrode and the negative electrode. As a result, the battery efficiency and the liquid energy density at the 10th cycle were 92% and 28 kWh/m³, respectively. Then the current density was increased to 600 mA/cm², and the circulating volume of each of the electrolytes was also increased to 35 mL/min, from the 11th cycle onwards, and the experiment was continued. As a result, the battery efficiency and the liquid energy density at the 20th cycle were 87% and 21 kWh/m³, respectively.

Example 8

A single cell was prepared and an experiment was carried out in the same manner as in Example 5, except that a smooth-surfaced, plate-like titanium substrate with a high void content, coated with carbon by an ionized deposition method under a high-vacuum, was used as the separation membrane electrode plate on the negative electrode side, instead of the separation membrane electrode plate on the negative electrode side obtained by bake plating platinum on a zirconium substrate used in Example 5. As a result, the battery efficiency and the liquid energy density at the 10th cycle were 90% and 28 kWh/m³, respectively. Then the experiment was continued under the same conditions as in Example 5, from the 11th cycle onwards. As a result, the battery efficiency and the liquid energy density at the 20th cycle were 86% and 20 kWh/m³, respectively.

Comparative Example 1

A single cell was prepared and an experiment was carried out in the same manner as in Example 1, except that carbon felt was used for both the positive electrode and the negative electrode, and rolled plates made of carbon were used as the positive and negative electrode current collector plates. As a result, the battery efficiency and the liquid energy density at the 10th cycle were 81% and 18 kWh/m³, respectively. Then the current density was increased to 600 mA/cm², and the circulating volume of each of the electrolytes was also increased to 35 mL/min, from the 11th cycle onwards, and the experiment was continued. As a result, the battery efficiency and the liquid energy density at the 20th cycle were 68% and 11 kWh/m³, respectively.

Comparative Example 2

A single cell was prepared and an experiment was carried out in the same manner as in Example 1, except that, instead of the zirconium electrode substrates used in Example 1, titanium electrode substrates having the same shape were used. As a result, the battery efficiency and the liquid energy density at the 10th cycle were 87% and 26 kWh/m³, respectively. Then the current density was increased to 600 mA/cm², and the circulating volume of each of the electrolytes was also increased to 35 mL/min, from the 11th cycle onwards, and the experiment was continued. As a result, the battery efficiency and the liquid energy density at the 20th cycle were 68% and 16 kWh/m³, respectively. When the surfaces of the electrodes were observed with a light microscope after the experiment, corrosion of the substrates was observed.

Comparative Example 3

A single cell was prepared and an experiment was carried out in the same manner as in Example 5, except that carbon felt was used for both the positive electrode and the negative electrode, and rolled plates made of carbon were used as the positive and negative electrode current collector plates. As a result, the battery efficiency and the liquid energy density at the 10th cycle were 81% and 18 kWh/m³, respectively. Then the current density was increased to 600 mA/cm², and the circulating volume of each of the electrolytes was also increased to 35 mL/min, from the 11th cycle onwards, and the experiment was continued. As a result, the battery efficiency and the liquid energy density at the 20th cycle were 62% and 11 kWh/m³, respectively.

DESCRIPTION OF SYMBOLS 1 separation membrane electrode plate on the positive electrode side
2 positive electrode current collector plate
3 positive electrode chamber
4 positive electrode electrolyte inflow passage
5 positive electrode electrolyte outflow passage
6 separation membrane
7 positive electrode electrolyte inlet nozzle
8 positive electrode electrolyte outlet nozzle
9 separation membrane electrode plate on the negative electrode side
10 negative electrode current collector plate
11 negative electrode chamber
12 negative electrode electrolyte inflow passage
13 negative electrode electrolyte outflow passage
14 negative electrode electrolyte inlet nozzle
15 negative electrode electrolyte outlet nozzle
16 gasket
17 fixing plate
18 bipolar plate

The invention claimed is:

1. A redox flow battery comprising a positive electrode, a negative electrode and a separation membrane,
   wherein a positive electrode electrolyte composed of an aqueous solution containing vanadium ions is supplied into a positive electrode chamber, and a negative electrode electrolyte composed of an aqueous solution containing vanadium ions is supplied into a negative electrode chamber, to carry out charging and discharging of the battery; and
   wherein zirconium or titanium coated with a noble metal or a compound thereof is used as a positive electrode material, and
      when the positive electrode material is zirconium coated with a noble metal or a compound thereof, the positive electrode electrolyte and the negative electrode electrolyte contain sulfuric acid; and
      when the positive electrode material is titanium coated with a noble metal or a compound thereof, the positive electrode electrolyte contains nitric acid and sulfuric acid, and has a nitric acid content of 0.5 mass % or more and 15 mass % or less based on the total amount of the electrolyte.

2. The redox flow battery according to claim 1, wherein the positive electrode is prepared by forming the positive electrode material in the shape of a box or a bag; and wherein the positive electrode comprises the positive electrode chamber formed therein, and a separation membrane electrode plate on the positive electrode side, which is a portion close to or in contact with the separation membrane.

3. The redox flow battery according to claim 2, wherein the separation membrane electrode plate on the positive electrode side is in the form of a porous or mesh-like plate.

4. The redox flow battery according to claim 1, wherein the redox flow battery has a structure in which:
a positive electrode electrolyte inflow passage through which the positive electrode electrolyte is supplied is disposed at the lower portion of the positive electrode chamber;
a positive electrode electrolyte outflow passage through which the positive electrode electrolyte flows out of the positive electrode chamber is disposed at the upper portion of the positive electrode chamber;
a negative electrode electrolyte inflow passage through which the negative electrode electrolyte is supplied is disposed at the lower portion of the negative electrode chamber;
a negative electrode electrolyte outflow passage through which the negative electrode electrolyte flows out of the negative electrode chamber is disposed at the upper portion of the negative electrode chamber;
the positive electrode electrolyte inflow passage and the positive electrode chamber are connected such that the positive electrode electrolyte is capable of flowing through the positive electrode electrolyte inflow passage into the positive electrode chamber;
the positive electrode electrolyte outflow passage and the positive electrode chamber are connected such that the positive electrode electrolyte is capable of flowing out of the positive electrode chamber into the positive electrode electrolyte outflow passage;
the negative electrode electrolyte inflow passage and the negative electrode chamber are connected such that the negative electrode electrolyte is capable of flowing through the negative electrode electrolyte inflow passage into the negative electrode chamber; and
the negative electrode electrolyte outflow passage and the negative electrode chamber are connected such that the negative electrode electrolyte is capable of flowing out of the negative electrode chamber into the negative electrode electrolyte outflow passage.

5. The redox flow battery according to claim 1, wherein the positive electrode material is zirconium coated with a noble metal or a compound thereof.

6. The redox flow battery according to claim 5, wherein zirconium coated with a noble metal or a compound thereof, zirconium coated with a carbon material, or a carbon felt is used as a negative electrode material.

7. The redox flow battery according to claim 5, which is a cell stack battery comprising a plurality of cells stacked in layers,
wherein the cell stack battery comprises positive electrodes, negative electrodes, separation membranes and bipolar plates; and
wherein each of the bipolar plates has recessed portions and projected portions, with at least a portion of the recessed portions being in contact with one of the separation membrane electrode plates, and at least a portion of the projected portions being in contact with another one of the separation membrane electrode plates.

8. The redox flow battery according to claim 7, wherein the bipolar plates are made of zirconium.

9. The redox flow battery according to claim 7, wherein the bipolar plates are each a wave-shaped plate, or a plate having the shape of a lattice, when drawn on a plane, in which the intersections of the lattice constitute the projected portions and the centers of the individual cells of the lattice constitute the recessed portions.

10. The redox flow battery according to claim 1, wherein the positive electrode material is titanium coated with a noble metal or a compound thereof.

11. The redox flow battery according to claim 10, wherein titanium coated with a noble metal or a compound thereof, titanium coated with a carbon material, or a carbon felt is used as the negative electrode material.

12. The redox flow battery according to claim 10, wherein titanium coated with a noble metal or a compound thereof is used as the negative electrode material, and wherein the negative electrode electrolyte contains nitric acid.

13. The redox flow battery according to claim 10, which is a cell stack battery comprising a plurality of cells stacked in layers,
wherein the cell stack battery comprises positive electrodes, negative electrodes, separation membranes and bipolar plates; and
wherein each of the bipolar plates has recessed portions and projected portions, with at least a portion of the recessed portions being in contact with one of the separation membrane electrode plates, and at least a portion of the projected portions being in contact with another one of the separation membrane electrode plates.

14. The redox flow battery according to claim 13, wherein the bipolar plates are made of titanium.

15. The redox flow battery according to claim 13, wherein the bipolar plates are each a wave-shaped plate, or a plate having the shape of a lattice, when drawn on a plane, in which the intersections of the lattice constitute the projected portions and the centers of the individual cells of the lattice constitute the recessed portions.

16. The redox flow battery according to claim 1, wherein the noble metal or the compound thereof coated on zirconium or titanium, to be used as the positive electrode material, is $IrO_2$, PtIr or $RuO_2$.

* * * * *